O. F. REITER.
STONE GATHERER.
APPLICATION FILED OCT. 19, 1920.
1,425,544.
Patented Aug. 15, 1922.
2 SHEETS—SHEET 2.
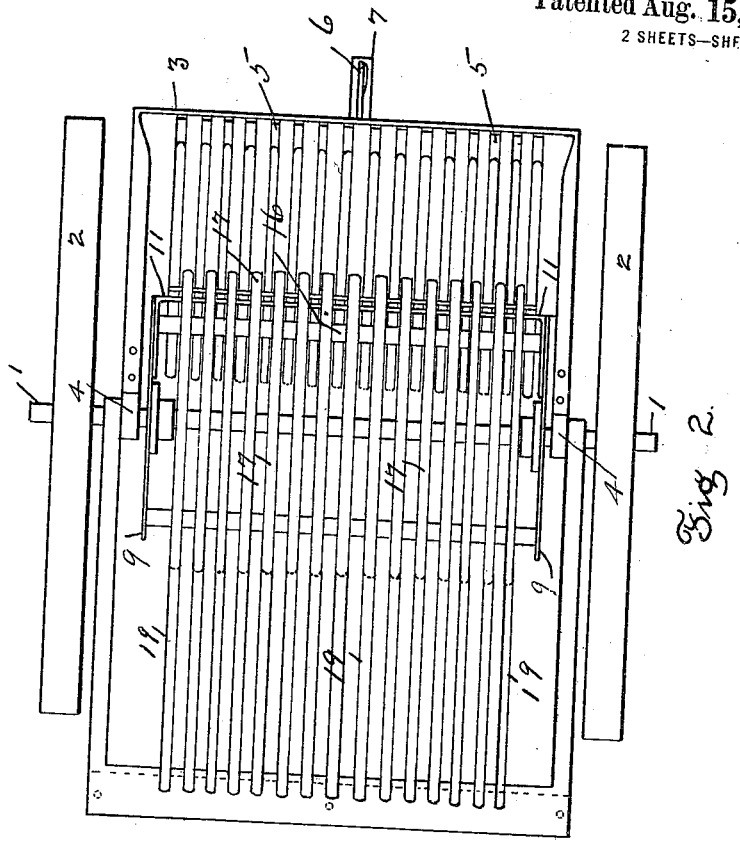
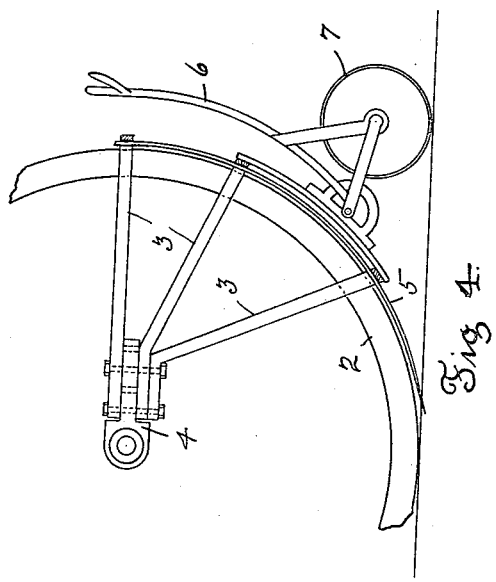
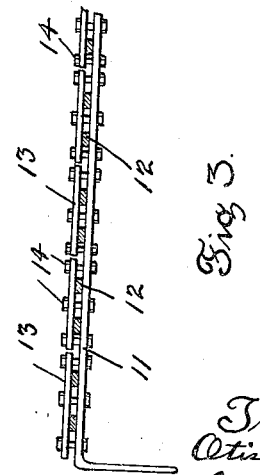
Inventor:
Otis F. Reiter

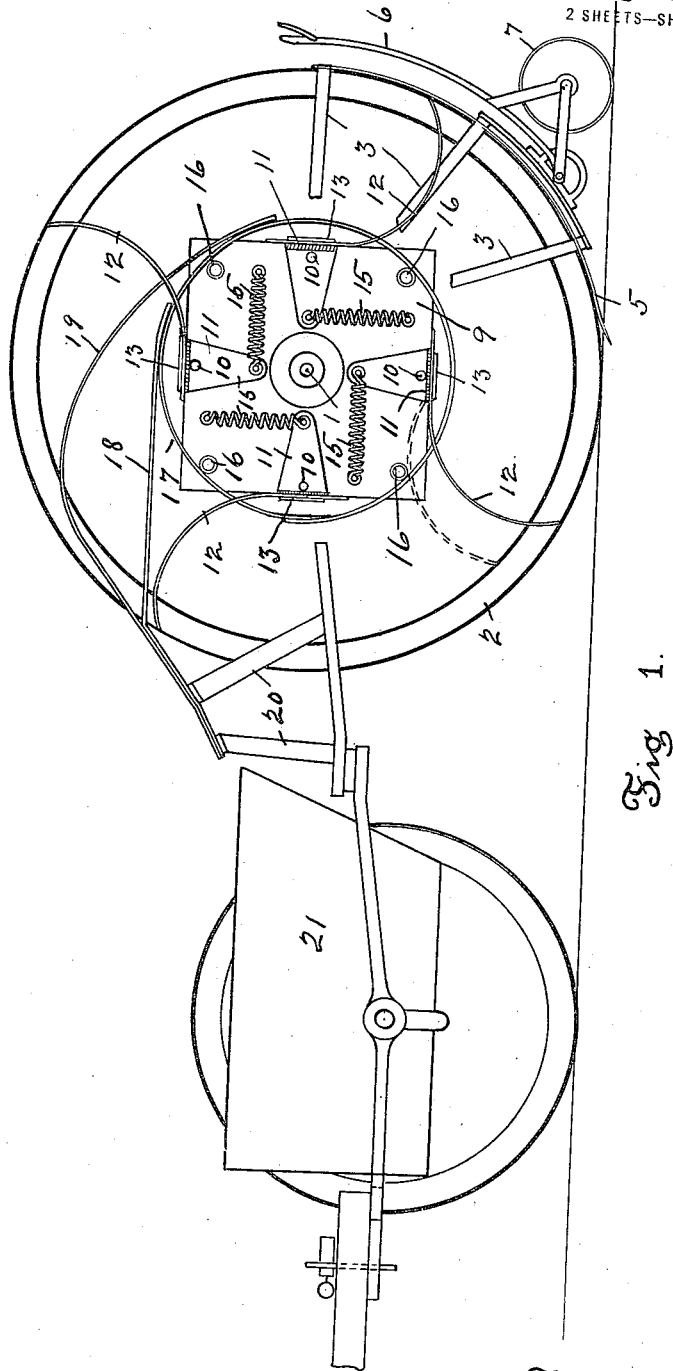

UNITED STATES PATENT OFFICE.

OTIS F. REITER, OF BALTIMORE, MARYLAND.

STONE GATHERER.

1,425,544.  Specification of Letters Patent.  Patented Aug. 15, 1922.

Application filed October 19, 1920. Serial No. 418,049.

*To all whom it may concern:*

Be it known that I, OTIS F. REITER, a citizen of the United States, residing at Baltimore, State of Maryland, have invented certain new and useful Improvements in Stone Gatherers, of which the following is a specification.

The invention relates to machines for gathering stones, and particularly to a machine of this character in which the stones are raked and conveyed to a suitable vehicle.

The general object of my invention is to provide a machine which will rake up the stones and convey them to a series of conveyer bars from which the stones fall by gravitation to a cart or wagon traveling in front of said machine.

A further object is to provide a machine of this character having a plurality of raker teeth, a plurality of lifting teeth, radially exposed around the axle of the machine and moving upward and rearward over the faces of the raker teeth, and a plurality of conveyer bars onto which the stones are carried by the lifting teeth and from which the stones fall into a cart or wagon traveling in front of the gathering machine.

A further object of this invention is to provide means whereby the lifting teeth may be so mounted upon the axle as to be readily replaced in case of breakage and in this connection to provide means which will prevent breakage of the raker teeth and of the lifting teeth by the blocking of stones between these teeth.

A further object is to provide means whereby the raker teeth may be lifted out or into operative position, and also adjusted to any suitable position.

The invention consists of the novel construction and arrangement of the parts and combination of parts hereinafter more fully set forth in the following specification and pointed out in detail in the appended claims.

In the accompanying drawing:—

Figure 1 is a side elevation of my invention.

Figure 2 is a top plan view of three of the lifting teeth bars removed therefrom.

Figure 3 is an enlarged detail view showing the bar to which the lifting teeth are secured.

Figure 4 is an enlarged detail view of the raker teeth and frame for carrying same.

Referring to the accompanying drawings, forming part of this specification, and in which like reference numerals designate like parts throughout the several views thereof, 1 designates the axle of the machine and 2 the wheels mounted upon and revoluble with said axle. At the rear of the machine is a frame 3 which is adjustably secured to the arms 4 which latter are loosely mounted on the shaft 1. The raker teeth 5 are secured to the frame 3 and are raised and lowered by means of the lever 6 which is connected with the wheel 7, the latter also being supported on the frame 3. The square plates 9 are mounted upon the axle 1 and revolve therewith. Pivoted to the said plates 9 at 10 are four bars 11 which extend across from one of said plates to the other and to which are adjustably secured the lifting teeth 12, the latter being held to the said bar 11 by the plates 13 and bolts 14. Each of said plates 13 extends across two teeth so that when it is desired to remove one of said teeth it will only be necessary to unbolt one of the plates 13. The said lifting teeth 12 are in vertical alignment with the raker teeth 5 and are adapted to lift the stones that are picked up by the raker teeth and carry them to the conveyer bars. The ends of the bars 11 are provided with coiled springs 15 which permit the said bars to tilt on the pivots to prevent breakage of the teeth 12 in event the latter should be caught by a stone between the raker teeth 5. The said plates 9 are provided with four rollers 16 one near each corner thereof upon which the metal bands 17 are supported. The said bands 17 are stationary and are held by the pieces 18 and conveyer bars 19. The said conveyer bars 19 and pieces 18 are secured at their opposite ends to the frame 20. The bands 17 and conveyer bars 19 are in staggered relation to the raker teeth.

The machine is drawn along in any suitable manner and as the raker teeth 5 rake up the stones the revolving lifting teeth 12 carry the said stones up on to the conveyer bars 19 far enough to allow them to fall by gravity down the forward inclined end of said bars 19 into the cart 21.

Having thus described my invention what I claim is:

1. In a stone gatherer, a rotatable axle, a wheel fixed to each end of said axle, a series of downwardly and forwardly curved raker teeth operatively supported rearward of the axle, a plate secured near each end of said axle and rotatable therewith, a plurality of bars each having its ends pivoted to said plates, a series of lifting teeth carried by said bars, and a series of conveyer bars upon which the raker teeth discharge disposed in staggered relation to the raker teeth, said conveyer bars being downwardly inclined at the front ends to allow the stones to fall therefrom.

2. In a stone gatherer, an axle, a wheel mounted on each end of said axle and rotatable therewith, a plate fixed near each end of said axle between the said wheels, a plurality of bars pivoted at each end to said plates, means for holding said bars in the normal position, a series of lifting teeth secured to each of said bars, a series of raker teeth operatively supported rearward of the axle, and conveyer bars upon which the raker teeth discharge disposed in staggered relation to the raker teeth, said bars being downwardly inclined at their forward ends.

3. In a stone gatherer a rotatable axle, a wheel mounted on each end of said axle, a plate mounted near each end of said axle and rotatable therewith, a plurality of bars pivoted at each end to said plates, a series of lifting teeth carried by said bars, a series of downwardly and forwardly curved raker teeth operatively supported rearward of the axle, a plurality of rollers mounted between said plates, a plurality of bands mounted on said rollers in staggered relation to the lifting teeth, and a series of conveyer teeth, and a series of conveyer bars arranged above said bands and in staggered relation to the lifting teeth, said bars projecting downwardly at their front end.

In testimony whereof I affix my signature

OTIS F. REITER.